(12) United States Patent
Hodgson et al.

(10) Patent No.: US 6,342,553 B1
(45) Date of Patent: Jan. 29, 2002

(54) ESTER POLYMER DISPERSION

(75) Inventors: Philip Kenneth Gordon Hodgson, Walton-on-Thames; Spencer Edwin Taylor, Camberley, both of (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/366,199

(22) Filed: Aug. 4, 1999

Related U.S. Application Data

(63) Continuation of application No. PCT/GB98/00320, filed on Feb. 2, 1998.

(30) Foreign Application Priority Data

Feb. 4, 1997 (GB) .............................................. 9702238

(51) Int. Cl.⁷ .............................. C08J 3/09; C08K 5/01; C08K 5/05; C08K 5/06
(52) U.S. Cl. .......................... 524/376; 507/90; 516/22; 516/27; 524/106; 524/379; 524/923
(58) Field of Search ............................. 516/22, 27, 31, 516/54, 68; 524/106, 376, 379, 923; 507/90

(56) References Cited

U.S. PATENT DOCUMENTS

| | | | | |
|---|---|---|---|---|
| 2,214,152 A | * | 9/1940 | Wilkes | 516/68 X |
| 3,740,367 A | * | 6/1973 | Winkelblech | 524/379 X |
| 3,790,520 A | * | 2/1974 | Ludwig | 524/376 |
| 4,594,378 A | * | 6/1986 | Tipton et al. | 524/106 X |
| 5,039,432 A | * | 8/1991 | Ritter et al. | 507/90 |
| 5,348,998 A | * | 9/1994 | Ito et al. | 524/379 X |
| 5,418,278 A | * | 5/1995 | Ritter et al. | 524/556 |

FOREIGN PATENT DOCUMENTS

| | | | |
|---|---|---|---|
| DE | 26 12 757 A1 | 9/1977 | |
| DE | 29 26 474 | 1/1981 | |
| DE | 42 36 337 C1 | 1/1994 | |
| EP | 0 359 061 A1 | 3/1990 | |
| EP | 0 448 166 A2 | 9/1991 | |
| GB | 2 189 251 A | 10/1987 | |
| JP | 0 066 940 | * 5/1980 | 524/376 |

* cited by examiner

Primary Examiner—Richard D. Lovering
(74) Attorney, Agent, or Firm—Nixon & Vanderhye

(57) ABSTRACT

A dispersion of an ester polymer in at least one liquid wherein the ester polymer is a polymer consisting essentially of a first monomer with structural units derived from at least one ester (1) of an aliphatic carboxylic acid with an aliphatic alcohol, wherein one of the acid and alcohol is ethylenically unsaturated and the other of the acid and alcohol has a long chain group of 14–40 carbons. A second monomer is optionally present which is a monomer derived from a different ester (2) within the same definition as ester (1), such that the mole average carbon content of the long chain group is 15–35, and a third monomer with structural units derived from a corresponding ester (3) of an aliphatic carboxylic acid and an aliphatic alcohol. One of the acid and alcohol is ethylenically unsaturated and the other has an aliphatic group of 1–13 carbons, such that at least 30% of the said aliphatic groups have 15–35 carbons. The polymer is present in said dispersion in at least 10% by weight and the dispersion is in a liquid which comprises at least one first organic liquid selected from (a) a branched or linear aliphatic hydrocarbon of 6–16 carbon atoms and (b) an aromatic hydrocarbon of 6–10 carbon atoms.

21 Claims, No Drawings

ESTER POLYMER DISPERSION

This is a continuation of PCT application No. PCT/GB98/00320, filed Feb. 2, 1998, the entire content of which is hereby incorporated by reference in this application.

The present invention relates to dispersions of ester polymers, and for their preparation and use, particularly in petroleum industry pipelines.

Crude oils are complex mixtures comprising hydrocarbons of varying types and molecular weights. One class of hydrocarbon present in the oils is paraffins which are linear, branched chain or cyclic hydrocarbons having at least 18 carbons which can form waxy solids. The solubility of these waxy solid forming components in the crude oils is predominantly temperature-dependant. They are usually soluble in the crude oil under down-hole conditions i.e. high pressures or high temperatures. However as the oil is brought to the surface its temperature and pressure are reduced. As a result the wax may begin to precipitate out and may form deposits on any cooler surface with which it comes into contact. These wax deposits can cause problems, such as blockage of pipelines, valves and other process equipment. The wax may also deposit in pipelines subsequently used to transport crude oil or fractions derived from the total product brought up from down-hole, such as fractions comprising gas, e.g. natural gas, and/or water, as well as a liquid hydrocarbon body, e.g. crude (or black) oil or "condensate"; the pipelines may thus be hydrocarbon lines or multi phase transportation lines with oil, gas and/or water. The wax may deposit on surfaces of metal e.g. of ferrous metal.

The contents of the transport pipelines are often cooler than the contents of lines on oil platforms or in refineries. This cooling is especially critical in respect of lines from offshore oil fields to the land and land lines in cold territories such as Alaska.

Wax deposition may be reduced in a number of ways, including keeping the lines hot, diluting the oil with solvent, or using special additives which interfere with wax crystal growth.

The special additives may usually be added to the pipeline upstream of the location of any potential cold area likely to result otherwise in deposition of wax. They may be added as a concentrate for ease of handling and are diluted by the oil to the requisite level for use. However some additives are difficult to form as concentrates for this purpose, because the concentrate is either too viscous or solid at the concentration required, especially at low temperatures, such as 10°, 5° or −1° C., conditions that may be experienced by the concentrate during its travel to the pipeline e.g. from an offshore platform.

We have discovered how to make concentrates of such additives.

The present invention provides a dispersion of an ester polymer in at least one first organic liquid, said ester polymer having a hydrocarbon backbone and at least a first type of side chain which is a long chain aliphatic group of at least 14 carbon atoms and especially also at least a second type of side chain, which is an alkyl of 1–13 carbons, said polymer being present in said dispersion in at least 10% e.g. at least 20% by weight.

The present invention also provides a dispersion of said ester polymer in an aqueous medium, said polymer being present in said dispersion in at least 10% e.g. at least 20% by weight.

The ester polymer usually has a backbone consisting essentially of carbon atoms in hydrocarbon groups to which backbone at least one side chain is attached via an ester group linkage. Usually each of the first and second types of side chain is linked to the backbone via an ester group linkage.

The ester polymer may be a polymer of a monomer with structural units derived from at least one ester (1) of an aliphatic carboxylic acid with an aliphatic alcohol, wherein one of the acid and alcohol is ethylenically unsaturated and the other of the acid and alcohol has a long chaingroup e.g. of 14–40 carbons, and optionally at least one of a monomer, which is a monomer with structural units derived from a different ester (2) within the same definition as ester 1, such that the mole average carbon content of the long chain group is 15–35 preferably 16.5–24 especially 17.5–22 or that at least 50% of the long chain groups have 15–35 carbons preferably 16.5–24 especially 18–22 carbons. In particular the ester polymer also is of at least one monomer with structural units derived from a corresponding ester (3) with structural units derived from an aliphatic carboxylic acid and an aliphatic alcohol, wherein one of the acid and alcohol is ethylenically unsaturated and the other has an aliphatic group e.g. of 1–13 carbons, such that at least 30% e.g. at least 50% of the said aliphatic groups have 15–35 carbons preferably 16.5–24 especially 18–22 carbons. Preferably the ester polymer comprises structural units from esters (1) and (3), and optionally (2).

The present invention also provides a dispersion of at least two different polymers selected from homopolymers (A) with structural units derived from an ester (1) and copolymers (B) thereof with structural units derived from a different ester (2) within the same definition as ester 1, such that the mole average carbon content of the long chain group is 15–35 preferably 16.5–24 especially 17.5–22 or that at least 30% e.g. at least 50% of the long chain groups have 15–35 carbons preferably 16.5–24 especially 18–22 carbons, and copolymers (C) of said ester (1) and optionally ester (2) with a corresponding ester (3) such that at least 30% e.g. at least 50% of the said aliphatic groups have 15–35 carbons preferably 16.5–24 especially 18–22 carbons.

The dispersion may also comprise
a) component (I), which is at least one N-substituted polyalkyleneimine compound with chain nitrogen atoms, which has at least one organic substituent of at least 6 carbon atoms on at least one nitrogen atom and/or
b) component (II) selected from at least one polymer of said homopolymers (A), copolymers (B) and copolymers (C) with the proviso that the dispersion comprises at least 2 components of which at least one is a component (I).

The dispersion of the invention may comprise at least two components (I) or may comprise at least one component (I) together with at least one component (II), which is preferably copolymer (C) and at least one of polymer (A) and (C).

The present invention also provides a dispersion of a polymer in at least one liquid, the polymer comprising at least one polymer A, B or C or component I, together with at least one monomeric additive, which has an aliphatic group of at least 14 carbons and a polar group, preferably a group containing one or more nitrogen atoms, especially with at least one tertiary or secondary amino nitrogen (and optionally in addition a primary) amino nitrogen atom, in particular in a heterocyclic group containing at least I nitrogen atom.

Preferably these polymers are obtainable by or obtained by transesterification of at least one polymer of an ester (3) with an aliphatic alcohol or carboxylic acid having an aliphatic group of 14–40 or 15–35 e.g. 16–24 carbons (depending on whether the acid or alcohol in ester 1 is unsaturated or aliphatic); the conversion may be substantially complete, but preferably is only 30–97% such as 30–90% e.g. 40–90% or 50–90%.

Ester 1 may be derived from an ethylenically unsaturated carboxylic acid and a long chain alcohol and in this case ester 2 and/or, ester 3 (if present) are of this same type; alternatively ester 1 may be derived from an ethylenically unsaturated alcohol e.g. "vinyl alcohol" and a long chain aliphatic carboxylic acid, and in this case ester 2 and/or ester 3 if present are of this same type.

The transesterification product may be used as such i.e. containing any unreacted polymer of ester (3) and/or unreacted alcohol or acid (respectively) with a 14–40 e.g. 16–24 carbons group, e.g. in amount of 1–50% e.g. 10–50% (by weight, based on the weight of polymer (3)) especially for unreacted alcohol. The unreacted alcohol or acid respectively may be substantially removed so the product may be in the substantial absence of said alcohol or acid.

The present invention also provides a method of reducing wax formation and/or deposition in wax-containing oil preferably in a pipeline containing said oil while flowing, which comprises mixing with said oil said dispersion of the invention.

The ethylenic unsaturated carboxylic acid for use in the ester polymers may contain the unsaturated group alpha, beta or gamma, or in another location, to the carboxylic group. It may contain 3–6 carbon atoms, and is especially an aliphatic alpha ethylenically unsaturated carboxylic acid of formula $R_{10}CH=CRCO_2H$, wherein each of R and $R_{10}$ which may be the same or different is hydrogen or an alkyl group of 1–3 carbons, e.g. methyl, ethyl or propyl; preferably $R_{10}$ is hydrogen. Methacrylic and especially acrylic acids are preferred. The acid may be a mono, di or tricarboxylic acid, examples of the acids being fumaric, maleic and crotonic acids.

The long chain aliphatic alcohol for use in the ester polymers is preferably linear, but may be branched (e.g. with a branch methyl group). The alcohol may be saturated i.e. an alkanol in which case preferably at least 40% of the saturated aliphatic groups have 15–35 carbons in particular when the copolymer consists essentially of units of esters 1 and 3. The alcohol may be ethylenically unsaturated i.e. an alkenol in which case preferably at least 50% of the aliphatic groups in the copolymer have 15–35 carbons and the molecular weight is at least 5000, e.g. at least 20,000 or 40,000 especially at least 5000 when the copolymer consists essentially of structural units from ester 1 and 3. The alcohol may contain at least one unsaturated group e.g 1–4 such as 1 or 2 or 3 or 4, especially 1 unsaturated group. The alcohol usually contains 14–40 carbons such as 15–25 carbons, especially 16, 18, 20, 22 or 24 carbons. The alcohol may be natural or synthetic e.g. from oxo or ALFOL processes. Examples of suitable alcohols are palmityl, hexadecyl, stearyl, octadecyl, eicosyl, docosyl, tetracosyl, hexacosyl, octacosyl and triacontyl alcohols, as well as oleyl and linoleyl alcohols and branched alcohols such as oxo alcohols e.g. 2-methyl eicosyl alcohol. The alcohols may be substantially pure, but are preferably mixtures of alcohols, e.g. as in tallow alcohol or mixtures of alkanols of even carbon number, with one carbon number predominating with decreasing proportions of alkanols of lower and higher carbon number (e.g. of Gaussian distribution) i.e. with carbon numbers distributed on either side of the major one. Such mixtures may contain at least 50% e.g. at least 80 or 90% (by mole) of one alkanol or alkenol. Examples of such mixtures are unsaturated alcohols e.g of 16 or 18 carbon atoms containing in wt % 50–100% of cis-alkenol, 1–15% e.g. 5–15% of trans-alkenol, 1–15% e.g. 5–15% of non-conjugated dieneols, 0.1–5% e.g. 1–5% of conjugated dieneols and optionally 1–20% e.g. 5–20% of saturated alkanols, especially C14, C16 or C18 saturated alkanols (such as in commercial oleyl alcohol), and/or saturated alcohols e.g. commercial behenyl alcohol with a majority of a 22 carbon alkanol and smaller amounts of 16, 18, 20 and 24 carbon alkanols.

To make the ester polymer there may also be used a mixture of alcohols with a bimodal distribution of the carbon number content, e.g. with at least 25% moles of each of 2 alcohols, especially alcohols different in at least 1, or at least 3 carbons, such as 1–9 e.g. 2 or especially 3–7 e.g. 4 or 6 carbons. Examples of such (mixtures are palmityl/stearyl alcohols and mixtures of hexadecyl/octadecyl, hexadecy/eicosyl, hexadecyl/docosyl, octadecyl/eicosyl, octadecyl/docosyl, octadecyl/tetracosyl and eicosyl/dosocyl and eicosyl/tetracosyl alcohols.

Mixtures of alcohols may also contain at least 20% of each of 2 alcohols and usually at least 30% of at least one alcohol; examples of these are mixtures of 16/18, 16/18/20, 18/20/22, 20/22/24 alcohols, e.g. as sold by Condea Germany.

In addition to the long chain ester monomer units in the copolymers, there may also be and preferably are short chain ester monomer units.

The polymers and copolymers may consist essentially of structural units derived from the esters 1 and/or 2, but advantageously they also contain structural units derived from esters(3) from a short chain aliphatic alcohol, such as a linear or branched one and saturated or unsaturated, in which case the copolymers consist essentially of units derived from esters 1 and/or 2 with 3. Examples of such alcohols are alkanols of 1–6 carbons, such as methanol, ethanol, n-propanol, n-butanol, iso-, sec- and tert-butanol, pentanol and hexanols; methanol or t-butanol are preferred.

The ethylenically unsaturated alcohol providing structural units for use in the ester polymers may contain the unsaturated group, alpha, beta or gamma to the alcohol group or in another location. It may contain 2–6 carbons, and is preferably allyl alcohol, methallyl alcohol, alpha-methyl vinyl alcohol or especially "vinyl alcohol" ($CH_2=CHOH$), which can form structural units for the ester polymers.

The long chain aliphatic acid for use in the ester polymers is preferably linear, but may be branched (e.g. with a branch methyl group). The acid may be saturated i.e. an alkanoic acid or ethylenically unsaturated i.e. an alkenoic acid. The acid usually contains 14–40 carbons such as 15–25 carbons, especially 16, 18, 20, 22, or 24 carbons. The acid may be natural or synthetic e.g. derived from oxo or ALFOL process alcohols. Examples of suitable acid are palmitic, hexadecanoic, stearic, octadecanoic, eicosanoic, docosanoic, tetracosanoic, hexacosanoic, octacosanoic and triacontanoic acids, as well as oleic and linoleic acids. The acids may be substantially pure, but are preferably mixtures of acids, e.g. as in tallow acid or mixtures of acids of even carbon number with one carbon number predominating with decreasing propertions or acids or lower and higher carbon number (e.g. of Gaussian distribution) i.e. with carbon numbers distributed on either side of the major one. Such mixtures may contain at least 50% e.g. at least 80 or 90% (by mole) of one alkanoic acid and smaller amount(s) of other alkanoic or alkenoic acid(s). Examples of such mixtures are unsaturated acids e.g of 16 or 18 carbons containing (in wt %) 50–100% cis-acid, 1–15% e.g. 5–15% of trans-acid, 1–15% e.g. 5–15% non-conjugated diacids, 0.1–5% e.g. 1–5% of conjugated diacids (such as in commercial oleic acid) or saturated acids e.g. behenic acid with a majority of 22 carbon alkanoic acid and smaller amounts of 16, 18, 20 and 24 carbon alkanoic acids.

To make this kind of ester polymer there may also be used a mixture of acids with a bimodal distribution of the carbon number content, e.g. with at least 25% moles of each of 2 acids, especially acids different in at least 1, or at least 3 carbons, such as 1–9 or especially 3–7 carbons. Examples of such mixtures are palmityl/stearic acids and mixtures of hexadecanoic/octadecanoic, hexadecanoic/eicosanoic, hexadecanoic/docosanoic, octadecanoic/eicosanoic, octadecanoic/docosanoic, octadecanoic/tetracosanoic and eicosanoic/docosanoic and eicosanoic/tetracosanoic acids.

In addition to the long chain ester monomer units in the polymers and copolymers, there may also be short chain ester monomer units.

The polymers and copolymers may consist essentially of structural units derived from the esters 1 and/or 2, but advantageously they also contain structural units derived from esters (3) from a short chain aliphatic acid, such as a linear or branched one, and saturated or unsaturated, in which case the copolymers consist essentially of units derived from esters 1 and/or 2 with 3. Examples of such acids are alkanoic acids of 1–6 carbons, such as formic, acetic, propionic, butyric/isobutyric, pentanoic and n-hexanoic acids; acetic and propionic acids are preferred.

In the polymers, structural units from alcohols or acids of different carbon number may be present in the same polymer, especially those with a bimodal distribution of alcohol/acid carbon number of at least 14 carbons.

The transesterification product may contain mixtures of polymers so that the average carbon chain length of the long chain aliphatic groups is 14–25 or 15–24 preferably 15.5–22.5 (or 16.5–22.5) particularly 16.5–22.0 (or 17.5–22.0) especially 17.5–2 1.0 (or 18.5–21.5) (in particular for oils of WAT 20–40° C. and/or pour point −20 to +20° C.); the ranges in brackets are particularly preferred for ester polymer derived from long chain alcohol. Pour points were measured as defined in the ASTM Standard. If the polymers with short chain groups are also considered the overall average carbon chain of the aliphatic side chains is preferably 11–18 (or 12–18) e.g. 11.5–17.5 (or 13.0–16.0) especially 12.5–17.0 (or 13.5–15.5) particularly for oils of WAT 20–45° C. and pour point −20 to +20° C.; the ranges in brackets are particularly preferred for ester polymer derived from long chain alcohols.

Preferred long chain monomers are acrylates of eicosyl alcohol, docosanol and behenyl alcohol, especially with at least 80% of 20 and/or 22 carbon alcohols respectively and at most 10% molar of any alcohol with 2 or 4 carbons higher or lower than 20 or 22 respectively.

Preferred copolymers are those with structural units from the above acrylates and structural units from at least one acrylate of an alcohol of 1–6 carbons, such as methanol or ethanol. The preferred copolymers contain 30–97% e.g. 30–90% or 40–90% preferably 50–90% molar of units from alcohols of 14–40 e.g. 16–24 carbons and 3–70% e.g. 10–70% or 10–60% or preferably 10–50% molar of units from the alcohol of 1–6 carbons. Of these 14–40 e.g. 16–24 carbon alcohols, at least 80% are preferably of 1 or 2 particular carbon number especially 16, 18, 20 or 22 in particular 20.

Other preferred long chain monomers are the vinyl esters of stearic, octadecanoic or eicosanoic and behenic acids, especially with at least 80% of 20 and/or 22 carbon acids and at most 10% molar of any alkanoic acid with 2 or 4 carbons higher or lower than 20 or 22 respectively.

Other preferred copolymers are those with structural units from the above vinyl esters and structural units from at least one vinyl ester of an acid of 1–6 carbons, such as acetic. The preferred copolymers contain 30–90%, 40–90% or preferably 50–90% molar of units from alkanoic acids of 14–40 carbons and 10–70%, 10–60% or preferably 10–50% molar of units from the acid of 1–6 carbons.

Of these 14–40 carbon acids, at least 80% are preferably of 1 or 2 particular carbon numbers, especially 16, 18, 20 or 22 particularly 20.

The polymers and copolymers of the invention may contain structural units from other unsaturated monomers e.g. monomers containing at least one N and/or S atom or O atom in an ether linkage, e.g. an amount of up to 10% by weight based on the total weight of structural units, but preferably structural units from such monomers are substantially absent. Thus preferred polymers and copolymers of the invention consist essentially of structural units of esters 1, and/or 2 and/or 3, in particular 1 and 3.

The polymers and copolymers may be made directly from the corresponding ester(s) and polymerisation, or preferably by transesterification of the corresponding ester polymers from an alcohol or acid of 1–13 carbons e.g. 1–6 or 1–4 carbons with the long chain aliphatic alcohol or mixture thereof, or long chain aliphatic acid or mixture thereof.

The polymerisation may be performed in a conventional manner e.g. with or without a diluent e.g. a hydrocarbon solvent, such as hexane, heptane, or a higher boiling hydrocarbon oil, at a temperature of 25–120° C., such as 60–100° C., and optionally in the presence of a free radical catalyst, such as a peroxide (e.g. benzoyl peroxide) or azo catalyst such as azobis isobutyronitrile. The polymerisation is usually performed under inert conditions e.g. under nitrogen or argon. The polymerisation time may be 0.5–40 hr, preferably 5–25 hr at 60–100° C. At the end of the polymerisation, the reaction product may be purified by evaporation under vacuum to remove unreacted monomer, and/or precipitation of the product with methanol from a liquid aromatic or aliphatic hydrocarbon solution of the product. The diluent for the polymerisation may be an aqueous medium in a suspension polymerisation to produce directly a dispersion of the polymer product in water; if desired water may be added or evaporated to change the concentration of the dispersion.

The transesterification may be performed in the absence of but preferably in the presence of a liquid aromatic or aliphatic hydrocarbon solvent, by reaction of a lower alkyl ester polymer(or lower alkanoic acid ester polymer) with the higher alcohol or alcohols (or higher acid or acids respectively). The transesterification may be performed with an amount of the long chain alcohol (or acid) substantially corresponding to the amount needed for the degree of conversion required, or an amount in excess thereof e.g. an amount substantially corresponding to an equimolar amount (based on the units of ester 3 in the starting polymer) may be used and the reaction stopped when the desired degree of transesterification has occurred e.g. as found from the amount of distilled by product lower alkanol or acid. The reaction may be performed at 50–150° C. e.g. 60–120° C. for 1–30 e.g. 5–20 hours, in the absence or presence of a catalyst e.g. an organic soluble strong acid such as an aromatic sulphuric acid e.g. p-toluene sulphonic acid or a basic catalyst, such as an alkali metal alkoxide e.g. sodium methoxide or ethoxide (added as such or prepared in situ from alkali metal and by product lower alkanol) or a polyvalent metal alkoxide such as tetra methyl or tetra ethyl titanate. Amounts of the basic catalyst e.g. alkali metal alkoxide may be 0.05–5% e.g. 0.1–1% by weight of the feed polymer. During the reaction the by product lower alcohol or lower acid is preferably evaporated. At the end, any solvent is advantageously evaporated, while optionally unreacted higher.alcohol or acid may be evaporated e.g. under reduced pressure. The transesterification may be performed substantially to completion e.g. 90–100% especially 95%–100%, with substantially no unreacted starting polymer e.g. 0–10% especially 0–5%, but advantageously the amount of reaction is 50–97% such as 50–90% e.g. 55–75% or 70–90% so the product contains (in relation to the aliphatic side chains) 3–50% e.g. 10–50% short chain e.g. methyl ester groups and 50–97% such as 50–90% long chain e.g. 25–45% or 3–50% e.g. 10–30% short and 55–75% or 70–90% long chain. Preferred transesterification products are ones with an average aliphatic side chain length of 12–19 carbons e.g. 14.5–18.5 or 15.5–18 especially for alkyl or alkenyl esters and advantageously for oils of WAT 20–45° C. and pour point −20 to +20° C.

Particularly copolymers are obtained by or obtainable by transesterification of the lower alkyl ester polymer (or lower alkanoic ester polymer) e.g. (m)ethyl (meth)acrylate homopolymer with the long chain aliphatic alcohol of 14–40 carbons (or homopolymer of vinyl acetate with the long chain aliphatic carboxylic acid of 14–40 carbons respectively), especially ones substantially pure or with a substantial unimodal carbon number distribution. In particular the transesterification is performed to 50–97% e.g. 50–90% completion, with evaporation of by product alcohol or acid, and with or without removal of unreacted higher alcohol or acid. Each transesterification product therefore preferably comprises a mixture of polymers with (as far as the aliphatic side chains are concerned) 50–97% e.g. 50–90% of long chain groups and 3–50% e.g. 10–50% of unreacted short chain e.g. lower alkyl ester groups; especially preferred are mixture with 60–80% or 75–95%, long chain groups and 40–20% or 5–25% unreacted short chain groups. Most preferred are partial transesterification products with side chains of methyl and $C_{20}$, and also methyl and $C_{16}$ or $C_{18}$ or $C_{22}$, especially with average alkyl side chain lengths of 13–19 e.g. 15–19 or 15.5–18.5, 15.5–19 especially 16–18, in particular with esters from long chain alcohols.

In the dispersions of the invention particularly preferred are blends of 2 or more copolymers C (or copolymers $C^1$), each obtained by or obtainable by direct copolymerisation or especially transesterification and each derived from an ester 3 which was the lower alkyl ester with the long chain aliphatic alcohol of 14–40 carbons, or derived from vinyl acetate with the long chain aliphatic carboxylic acid of 14–40 carbons respectively, especially ones substantially pure or with a substantial unimodal carbon number distribution.

Most preferred are blends of copolymers of esters 1 and 3 in particular partial transesterification products with side chains of methyl and $C_{20}$, and also methyl and $C_{16}$ or $C_{18}$ or $C_{22}$, especially with average alkyl or alkenyl side chain lengths of 15.5–19 especially 16–18, in particular with esters from long chain alcohols (saturated or unsaturated).

The blends of polymers involve at least two polymers selected from A, B and C and include blends of polymers differing in the nature and/or proportion of their structural units and/or in their molecular weight especially blends of polymers C differing in the length of the chains in their structural units. The polymers, especially polymer C may also differ in their manufacturing route, i.e. direct or transesterification but both are preferably the same, especially transesterification.

Preferably a blend of polymers is used in which each polymer has an essentially unimodal distribution of alcohol/ acid carbon numbers in the 16–40 range, and such that there is an overall bimodal distribution of alcohol/acid carbon numbers in the polymers combined. Blends of 2 of these unimodal polymers may contain them in a 10–90:90–10 e.g. 20–80:80–20 molar ratio e.g. so that the average carbon chain length of the long chain aliphatic groups is 14–25 or 15–24 preferably 15.5–22.5 (or 16.5–22.5) particularly 16.5–22.0 (or 17.5–22.0) especially 17.5–21.0 (or 18.5–21.5) (in particular for oils of WAT 20–50° C .and pour point −20 to +20° C.); the ranges in brackets are particularly preferred for ester polymer derived from long chain alcohols. Pour points were measured as defined in the ASTM Standard. In addition to this distribution of long chain carbon numbers, the polymers may also contain structural units from alcohols or acids of 1–6 carbons, so the distribution may be trimodal or higher modal e.g. when the polymers contain units from esters 1, 2 and 3, in this case the average carbon chain of the aliphatic side chains is 11–18 (or 12–18) e.g. 11.5–17.5 (or 13.0–16.0) especially 12.5–17.0 (or 13.5–15.5) particularly for oils of WAT 20–45° C. and pour point −20 to +20° C.; the ranges in brackets are particularly preferred for ester polymer derived from long chain alcohols, whether saturated or unsaturated.

The polymers of the present invention may have a molecular weight of 500 to 200,000, e.g. 500 to 39,999, preferably 5,000 to 35,000 and especially 20,000 to 30,000 or for example 40,000 to 200,000, preferably 80,000 to 160,000(Mw, weight average molecular weight) and the molecular weight distribution (Mw/Mn) may be 1.2–20 e.g. 1.2–10, preferably, 1.4–2 or 2–20 e.g. 5–15. As used herein, unless otherwise specified, the term "Molecular Weight" of an ester polymer produced by transesterification of the corresponding precursor ester polymer means the weight average molecular weight of the ester polymer obtained by calculation from the percentage conversion (based on spectroscopic analysis) and the molecular weight of the precursor ester polymer or the weight average molecular weight of the ester polymer itself, the molecular weight being determined by gel permeation chromatography (GPC) against polystyrene standards as described in the Aldrich Chemical Company's Standard Test Method for GPC; the term "Molecular Weight" of an ester polymer produced by direct polymerisation of the corresponding ester means the weight average molecular weight of the ester polymer determined by gel permeation chromatography (GPC) against polystyrene standards as described in the Aldrich Chemical Company's Standard Test Method for GPC In the dispersion, the ester polymer is usually present as solid particles e.g. of average particle size of 1–20 microns or less than 15 or less than 11 microns, but especially 2–5 microns. In the presence of a suitable second liquid as described further below, the ester polymer may be in the form of droplets of a solution or suspension of polymer in the first liquid, dispersed as an emulsion in the second liquid. The average droplet size may be 1–50 e.g. 1–40 microns, especially 5 to 10 microns or 15–45 microns. The solid particles may have a size distribution of 1–20 microns, in particular 2–5 microns.

The first organic liquid in the dispersion may be a single liquid e.g. hydrocarbon, or may be a one liquid phase mixture of a first liquid e.g. hydrocarbon and a third organic liquid. The first organic liquid is usually a hydrocarbon e.g.

an aliphatic hydrocarbon such as one of 6–16 carbons which may be linear or branched such as iso-octane, dodecane or hexadecane or an aromatic hydrocarbon e.g. of 6–10 carbons such as benzene, toluene, xylene, mesitylene, or a mixture thereof or of aromatic and/or aliphatic hydrocarbons e.g. an aliphatic hydrocarbon with up to 50% (e.g. 1–40%) aromatic, components e.g. trimethyl benzenes. The first organic liquid may also be selected from oxygenated hydrocarbons e.g. as defined below, in particular alkanols which have one hydroxyl group per molecule and glycol ethers. The first organic liquid in the dispersion capable of acting as an organic solvent for the polymer in the hot such that it can form a solution of at least 25% wt concentration of the polymer at 80° C. e.g. 25–70% such as at least 30% e.g. 30–55% or at least 50% such as 50–60% by weight. The first organic liquid e.g. aliphatic hydrocarbon or oxygenated hydrocarbon may be one in which the polymer is incapable of forming a 25% wt solution at 20° C., especially incapable of forming a 15% or 5% solution of the polymer at 20° C., a particular first liquid is more likely to fall into this category with increasing alkyl chain length and/or molecular weight of the polymer. The first organic liquid e.g. hydrocarbon preferably has a flash point above 20° C. e.g. above 40° C.

Preferably however, a blend of organic liquids is used, the first being capable of forming the 25% plus solution at 80° C. e.g. the first organic liquid especially the hydrocarbon, and a third organic liquid which is completely miscible in all proportions at 25° C. with the first liquid e.g. hydrocarbon, but being incapable alone of dissolving 10% especially more than more than 1% of the polymer at 20° C. In addition the third liquid usually is non swelling for the polymer and preferably causes less than 10% e.g. less than 2% swelling (by volume) of the polymer at 20° C. The third liquid is usually an oxygenated hydrocarbon e.g. an organic liquid with 1–6 oxygen atoms, especially in an alcohol, ether, glycol ether, ketone or ester environment and in particular with a flash point above 20° C. especially 40° C. Examples of such third liquids are alkanols of 8–18 carbons, both linear and branched, such as 2-ethyl hexanol, isononanol, lauryl alcohol, dialkyl ethers of 8–16 carbons such as dibutyl ethers, glycols and glycol mono and di ethers, and ketones e.g. of 6–16 carbons such as cycloaliphatic ones such as isophorone, dialkylketones such as methyl.isoamyl ketone, and alkyl aryl ones e.g. acetophenone and acetals such as 2-ethyl hexyl butyraldehyde acetal. Glycols and glycol ethers are preferred, especially ones of formula

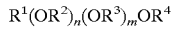

$R^1(OR^2)_n(OR^3)_mOR^4$ wherein each of $R^1$ and $R^4$, which may be the same of different is hydrogen or an alkyl of 1–8 carbons, such as methyl, ethyl, isopropyl, n-butyl or hexyl, each of $R^2$ and $R^3$, which may be the same or different is an alkylene group of 2–4 carbons, such as 1,2-ethylene, 1,3-propylene, 1,2-propylene or 1,4-butylene, and n and m are 0 or integers of 1–6, with the proviso that at least one of n and m is 1–6. Preferably $R^1$ is alkyl of 1–8 carbons. Preferably $R^2$ is 1,2-ethylene, n is 1–3 especially 2 or 3, m is 0, $R^4$ is hydrogen and $R^1$ is alkyl of 1–6 carbons especially n-butyl, such as mono butyl ethylene glycol ether, and in particular mono-butyl-diethylene glycol ether.

The third liquid may also be an ester of an aliphatic carboxylic acid e.g. an alkanoic acid of 2–6 carbons such as acetic, and a compound with at least one hydroxyl group, such as an alkanol of 4–10 carbons e.g. amyl alcohol, or a phenol of 6–8 carbons, such as phenol, or an arylalkanol of 7–10 carbons such as benzyl alcohol, or a glycol- ether, e.g. as defined above. Preferred are butyl ethylene glycol acetate, amyl acetate and benzyl acetate.

The weight ratio of the first liquid e.g. hydrocarbon to third liquid may be 100–10:0–90 e.g. 99–40:1–60 such as 100–50:0–50 preferably 90–70:10–30 or 40–60:60–40; alternatively the said weight ratios may be 15–70:85–30 in particular 15–45:85–55 especially for polymers with alkyl side chains of 15–19 carbons. Some third liquids within the chemical definitions above, may dissolve the polymer sufficient for use as first liquids above, i.e. where the polymer dissolves sufficiently e.g. 25–30% in the hot e.g. 80–100° C. but insufficiently in the cold e.g. 20° C., so a dispersion is formed on cooling. Examples of such liquids are the alcohols, and the glycol ethers.

The dispersions of the invention contain at least 10% of the polymer e.g. at least 15% or at least 20% or 25%, such as at most 35%. In particular, when the polymer contains side chains of at least 19 carbons (excluding the ester COO group), the dispersions usually contain at least 10% of polymer e.g. 10–30%, while with polymers with 17–21 carbon alkyl or alkenyl side chains the dispersion can contain at least 15% such as 15–35%, and for polymers with 15–19 carbon alkyl chains the figures are 20–35% especially 25–35%.

The dispersions of the invention may be made according to an aspect of the present invention by a process in which a solution of the ester polymer in an organic solvent which is a first organic liquid at a temperature of at least 60° C. is cooled. With some first liquids simple cooling suffices to result in formation of a dispersion (e.g. with solubilities of the liquid as described above). Preferably the cooling is in the presence of the third liquid. Advantageously the third liquid is added cold, or especially at the same temperature as the solution with or without agitation. A dispersion may be formed at the temperature of mixing but preferably the third liquid is added to the hot solution until the mixture obtained is just not cloudy; the mixture obtained is then allowed to cool slowly, e.g. at a rate of not more than 10° C. per minute. The cooling may be without or preferably with agitation e.g. stirring.

Preferably the hot solution contains at least one dispersing agent so that the cooling is performed in its presence. Examples of suitable dispersing agents are described further below.

The dispersion made initially on cooling may have a broad spread of particle sizes. Advantageously, the distribution is reduced by comminution of the dispersion e.g. under high shear or with ultra sound, especially in the presence of at least one dispersing agent, which may have been added for the comminution step or may have been added for the cooling step. The comminution may be performed during the cooling or preferably subsequently. Once the dispersion has been made further second or third liquid may be added if required to reduce the viscosity of the dispersion further.

The dispersing agent may be a surfactant, which is anionic, nonionic or cationic or zwitterionic. Anionic ones may be salts of carboxylates and sulphonic and sulphate acid esters, in particular ones with at least one long chain aliphatic group of 8–20 carbons; examples are salts of fatty acids e.g. lauric, long chain alkyl benzene sulphonic acid e.g. dodecyl or linear alkyl benzene sulphonates. The cation of the salt may be an alkali metal e.g. sodium or quaternary ammonium. Examples of nonionic ones are polyalkylene oxides of molecular weight at least 1000, polyethyleneoxylated long chain alcohols and long chain alkyl phenols, e.g. 8–12 alkyl phenol polyethylenoxylates with 4–30 ethylenoxy units e.g. 4–10 or 10–25 units, such as nonyl phenyl 6 or 20 ethoxylates and fatty acid ethanolamides. Examples of cationic ones are long chain alkyl quaternary ammonium salts, especially with one long chain alkyl (e.g. 8–20 such as 12–18 carbons e.g. cetyl (bonded direct to the quaternary nitrogen atom or via an aryl alkyl group e.g. of 7–9 carbons such as benzyl) and three short chain alkyls e.g. of 1–4 carbons, such as methyl; one of the short chain alkyls may be replaced by an aralkyl group e.g. of 7–16 carbons such as benzyl. The salt may be a halide e.g. chloride or bromide or a sulphate. Cetyl trimethyl ammonium bromide is preferred. Preferably the dispersing agent is a nonionic or cationic one. The amount of dispersion agent may be 0.1–10% e.g. 0.5–5%(based on the total weight of the polymer).

To prepare a dispersion which is an emulsion, the polymer in the first liquid e.g. hydrocarbon may be emulsified into a second liquid, which is substantially immiscible with the first liquid. The second liquid is usually one in which the polymer is substantially insoluble e.g. with a solubility at 20° C. of less than 5% e.g less than 1% by weight. An example of the second liquid is water, while the first liquid may be as described above [especially a hydrocarbon]. In the emulsification, a dispersing agent such as one described above or monomeric additive as described below may be present.

In a further aspect of the invention, a dispersion in a medium comprising a first liquid alone or with third liquid may be treated to separate solid polymer, e.g. filtered, and the separated solid resuspended with or without dispersion agent in water or a third liquid or a fourth organic liquid in which the polymer is substantially insoluble e.g. less than 10% or especially less than 1% at 20° C. The present invention also comprises the dispersion of said solid polymer in the water, third liquid or fourth organic liquid. Examples of the latter are compounds immiscible with the first liquid e.g. polyhydric alkanols such as alkane di or polyols such as ethylene glycol or glycerol. Mixtures of these liquids may be used e.g. water with third or fourth liquids, especially in weight proportions of 10–90:90–10 in particular 50–90:50–10. Dispersions in water may contain up to 20% by wt of an antifreeze e.g. a glycol or polyhydric alcohol.

The dispersions of the invention usually have a reduced viscosity (especially at low temperatures e.g. less than 10° C. or less than 5° C.) and may have a reduced pour point compared to a solution of the polymer of comparable total polymer concentration. The dispersions of the invention are thus usually pumpable even at low temperatures. The viscosities of the dispersions measured at 10° C. at a shear rate of 92 sec$^{-1}$ using a concentric cylinder arrangement on a rheometer e.g. a Bohlin VOR machine produce values of less than 500 cP, preferably less than 200 cP and especially less than 100 cP, such as 10–117 cP (or 10–100 cP or 100–200 cP) e.g. are usually (or not more than) 165 cP e.g. 117–165 cP. Advantageously the viscosities measured at 5° C. (but otherwise under the same conditions) are preferably less than 500 cP or 200 cP e.g. not more than 172 cP, or less than 100 cP such as 10–200 cP e.g. 20–100 cP or 100–200 e.g. 124–172 cP. At -1° C. the viscosities measured otherwise under the same conditions may be less than 500 cP or 200 cP e.g. not more than 194 cP, or less than 100 cP such as 10–200 cP e.g. 20–100 cP or 100–200 e.g. 140–194 cP. The dispersions are usually substantially non sedimenting e.g. with less than 5% separation on standing under gravity for 5 days.

The dispersions of the invention advantageously contain at least one monomeric additive with a long chain hydrocarbyl group and a polar group. The additive is oil soluble e.g. soluble in diesel oil at 25° C. to at least 1 g/l e.g. at least 10g/l. The additive preferably has surfactant activity and especially surface wetting activity.

The hydrocarbyl group in the additive may be linear or branched aliphatic, e.g. alkyl or alkenyl with at least 10 carbons such as 14–30 e.g. 16–24; examples are dodecyl, cetyl, stearyl, palmityl, tallyl, and hydrogenated tallyl and oleyl. The polar group may contain at least one oxygen atom e.g. in an ether or alcohol group such as a hydroxyl or 2-hydroxyethyl group, and/or at least 1 e.g. 1–4 nitrogen atoms e.g. in a primary secondary and/or tertiary amine or amide group, especially one nitrogen atom in a primary amine and one nitrogen atom in a secondary or tertiary amine or amide in particular in a non cyclic structure, or with one nitrogen atom in a primary amine and/or 2 nitrogen atoms in a tertiary amine, in particular in a heterocyclic compound.

The additive may be a long chain substituted amine with 2 or more nitrogens, in particular ones with the long chain hydrocarbyl group attached directly to one nitrogen atom, preferably in an NH group, and with a primary amine NH2 group elsewhere in the molecule, especially separated from the long chain group by the NH group. Such additives may be of formula

$$R_2\text{-NH-}(C_nH_{2n}NH)_mC_pH_{2p}NH_2 \qquad (I)$$

wherein $R_2$ is a long chain hydrocarbyl group e.g. as defined above, n and p are integers of 2–5 especially 2 or 3 and m is 0 or an integer of 1–8 e.g. 1–6 such as 0, 1 or 2. Preferred additives are mono N-terminal hydrocarbyl derivatives of 1,2-ethylene diamine, 1,2- and 1,3-propylenediamine and 1,2-, 1,3- or 1,4-butylenediamine, as well as diethylene triamine and triethylene tetramine. Examples of such compound are mono- terminal N hydrocarbyl derivatives of 1,3-propylene diamine and diethylenetriamine, in particular where the aliphatic group is alkyl or alkenyl e.g. stearyl, oleyl, "tallyl" (i.e. a mixture of stearyl, palmityl and oleyl) and hydrogenated tallyl (a mixture of stearyl and palmityl); mono terminal N-hydrogenated tallyl-1,3-propylene diamine is preferred.

The additive may also be the corresponding long chain amido amine e.g. of formula

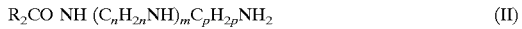

$$R_2CO\ NH\ (C_nH_{2n}NH)_mC_pH_{2p}NH_2 \qquad (II)$$

where $R_2$, n, m and p are as defined above. Preferred are the amido analogues of the above amines, especially N-tallowyl-1,3-propylene diamine.

The additive may also be a hydroxy alkyl or amino alkyl derivative of either the long chain amine or long chain amido amine. Such additives may be of formula

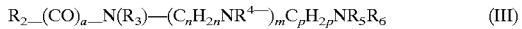

$$R_2\text{---}(CO)_a\text{---}N(R_3)\text{---}(C_nH_{2n}NR^{4-})_mC_pH_{2p}NR_5R_6 \qquad (III)$$

where $R_2$, m, n and p are as defined above, and each of $R_3$, $R_4R_5$ and $R_6$ which is the same or different represents hydrogen or $(C_bH_{2b}NR^4)_rC_cH_{2c}NR_5R_6$, or $(C_dH_{2d}O)_sC_eH_{2e}OH$, and at least one of $R_3$–$R_6$ does not represent hydrogen, wherein each of b, c, d, and e is as defined for n above and r and s are each as defined for m above and a is 0 or 1. Such additives are mono or poly alkoxylated or amino alkylated derivatives of the additives of formula I. Preferred are hydroxymethyl derivatives of those additives, especially wherein each of $R^1$–$R^4$ is hydroxymethyl. Preferred are N-tallyl (or tallowyl) 1,3-propylene diamine polyethoxylate with an average 2–6, e.g. 4–5 ethyleneoxy units and its hydrogenated derivative with saturated long chain alkyl groups.

The additive may be a long chain aliphatic hydrocarbyl N-heterocyclic compound, which is not quaternised. The aliphatic hydrocarbyl group in the heterocyclic compound usually has 8–24 carbons in the hydrocarbyl group, preferably a linear saturated or mono or diethylenically unsaturated hydrocarbyl group; cetyl-, stearyl and especially oleyl-groups are preferred. The N-heterocyclic compound usually has 1–3 ring N atoms, especially 1 or 2, which compound usually has 5–7 ring atoms in each of 1 or 2 rings; imidazole and imidazoline rings are preferred. The heterocyclic compound may have the aliphatic hydrocarbyl group on an N or preferably C atom in the ring; the ring may also have an amino-alkyl (e.g. 2-amino ethyl) or hydroxyalkyl (e.g. 2-hydroxyethyl) substituent, especially on an N atom. N-2-aminoethyl-2-oleyl-imidazoline is preferred. The long chain amine usually contains 8–24 carbons and preferably is an aliphatic primary amine, which is especially saturated or mono ethylenically unsaturated; an examples is dodecylamine and oleylamine. Mixtures of any of the above additives with each other may be used.

If desired the additive e.g. a long chain amine may also comprise a phosphate ester salt, especially one with surface wetting activity. Such phosphate esters are anionic surfactants, which are salts of alkali metals e.g. sodium or a quaternary ammonium e.g. tetra methyl ammonium or tetrabutyl ammonium salts of acid phosphate esters, e.g. with 1 or 2 organic groups and 2 or 1 acidic hydrogen atoms; examples of the organic groups are alkyl or alkenyl groups as described for R above. Examples of such phosphate ester salts are mono and dioctyl acid phosphate salts and mixtures thereof. A preferred blend comprises a long chain alkylamine and a phosphate ester salt e.g. as sold as NAL 1272 by Nalco.

The amount of additive is usually in a weight ratio of 1:500 to 1:10 e.g. 1:50 to 1:15 by weight based on the total dry weight of the polymer.

The oil whose flow characteristics are to be improved usually comprises a liquid hydrocarbon and at least one wax.

The hydrocarbon is usually primarily aliphatic in nature, but may contain up to 50% w/w liquid aromatic compounds. The hydrocarbon may be a crude or black oil or non volatile fraction from a distillation of crude oil, such as a vacuum or thermal residue. Preferably the hydrocarbon is an oil field product, e.g. either a whole well product, the multiphase mixture in or from the well bore, or one at the well head after at least partial separation of gas and/or water, and may be flowing up a well bore, or on a production platform or between platforms or from a platform to a collection or storage facility e.g. from offshore to onshore. Particularly of interest are hydrocarbons moved in pipelines under the sea under low temperature conditions e.g. in latitudes of greater than 50° N or S or in Gulf of Mexico. The hydrocarbon may contain up to 50% by weight of wax usually 0.5–30% or 1–15% especially 2–9% and the wax may contain 20–100 e.g. 20–60 or 30–60 or 40–70 carbon atoms; the hydrocarbon may contain 0.1–5% e.g. 0.2–1% of waxes of 20–60 carbons. The hydrocarbons may contain dissolved gas (e.g. with amounts of up to 10% gas) or water or water droplets e.g. with 5–40% water (e.g. as in water in oil emulsions, so called "chocolate mousse"). There may also be gas and/or water as a physically separate phase. The hydrocarbons may in the absence of the copolymers of the invention, have a wax appearance temperature (WAT) value which approximates the cloud point value of at least 0° C. e.g. 0–60° C. such as 10 to 50° C. or especially 20–40° C.; pour point of such hydrocarbons may be 10–50° C. e.g. 20–50° C. lower than the WAT value and may be −30° C. to +20° C. e.g. −20° C. to +10° C. The copolymers of the invention may reduce the WAT value of the liquid hydrocarbon by at least 2° C. e.g. 2–20° C. such as 5–15° C., and can reduce the rate of wax deposition per unit time.

The polymers may also delay the onset of wax nucleation e.g. as shown by light scattering and they may also reduce the pour point and/or modify the wax crystals or disperse the wax. In particular the copolymer may reduce the weight of wax deposition either by reducing the rate of deposition and/or by reducing the temperature of onset of deposition. The reduced wax deposition may be associated with reduced wax in suspension (i.e. reduced total wax formation) or the same or an increased amount of wax in suspension (i.e. the altering distribution of wax between suspension and deposition).

The polymer dispersions of the invention may be mixed in a portion with the hydrocarbon to be protected or may be mixed batchwise, continually or continuously with a moving usually liquid body of that oil e.g. hydrocarbon, preferably added to a line containing flowing liquid hydrocarbon to be protected, upstream of a cooler location where wax deposition may occur in the absence of said compound. If desired the polymers of the invention may be added to a tank of the oil e.g. to inhibit deposition of wax. The amount of polymer added may be 10–10,000 ppm e.g. 100–5000 ppm based on the weight of oil e.g. hydrocarbon, there may also be present 5–2000 ppm e.g. 30–1000 ppm (on the same basis) of long chain alcohol, e.g. of 14–40 or 15–25 carbons, such as described for use in the preparation of the ester polymer.

The invention is illustrated in the following Examples

Preparation of Polymers

Polymer A

A stirred solution of poly(methyl acrylate), MW 40,000, (8.6g) and docosanol (29.3g) (0.9 equivalents) in anhydrous toluene (100 ml), with added sodium methoxide catalyst (40 mg), was heated in an oil bath at 130° C. under Dean-Stark solvent removal conditions for 7 hours. Toluene (10 ml) was removed in this manner after each 0.5 hr period and an equal amount of fresh toluene was replaced at that time. Extra sodium methoxide (40 mg) was added after 4 h, then again after a further 0.5 h. The product obtained was evaporated under vacuum to remove the toluene.

Proton NMR spectroscopy indicated that the transesterification had proceeded to 82% because of a 82:18 ratio of signals from the ester alkyl hydrogens to ester methyl hydrogens. The product also contained unreacted docosanol. The polymer product had a calculated MW of 152000.

Polymer B

The procedure to make polymer A was followed with poly(methyl acrylate) (6.88 g) and eicosanol (0.9 equivalents). 1H NMR spectroscopy indicated a degree of transesterification of 68%. MW was calculated at 124000.

EXAMPLE 1

A 60% (by weight) solution of a polymer B in a mixed trimethylbenzene solvent (sold by Exxon under the SOLVESSO 100 Registered Trade Mark) was made by mixing the various components together up to 70° C. The solution was very viscous. To the hot solution at 70° C. was added with stirring mono-butyl diethylene glycol (BDGE) dropwise, in a 1:1 weight ratio(i.e. with polymer:solvent:BDGE weight ratios of 60:40:100), and then the solution obtained at 70° C. was allowed to cool to 20° C. over 10 mins with stirring to leave a fluid but coarse dispersion of solid polymer of broad particle size distribution of 10–200 microns.

For Ex. 1C and D to the dispersion with stirring was added 1% by weight of polymer of a dispersing agent, as specified below, followed by high shear mixing in an UltraTurrax shear mixer operated at 5000 rpm for 20 seconds. The fine dispersion obtained had particles substantially all of which were of less than 10 microns in size; the dispersion was smooth and substantially non sedimenting on standing for 5 days.

The viscosities of the dispersions were measured at a shear rate of 92sec$^{-1}$ and using a concentric cylinder arrangement on a Bohlin VOR rheometer.

For Ex. 1B the dispersing agent was added to the solution of polymer B before addition of BDGE, and for Ex. 1A no dispersing agent was added at all.

The dispersing agent was (X) hexadecyltrimethyl ammonium bromide (CTAB), or (Y) nonyl phenyl hexaethyleneoxylate NP6 (a nonionic compound).

The viscosity results are shown in table 1 for the 30% dispersions. The viscosities were compared with that of a 30%(wt) mixture of the polymer B in the SOLVESSO 100 solvent (Ex. 1E).

TABLE 1

| Example | | Viscosity (cP) at Temperature | | | |
|---|---|---|---|---|---|
| | | -1° C. | 5° C. | 10° C. | 16° C. |
| 1A | No addition of dispersing agent | 185 | 172 | 165 | 167 |
| 1B | Additive X before pp | 145 | 124 | 117 | 117 |
| 1C | Additive X after pp | 140 | 130 | 125 | 127 |
| 1D | Additive after pp | 194 | 166 | 148 | 145 |
| 1E | Blank (30%) solution | Solid | Solid | Solid | 110 |

Ex. 1A–D are dispersions, Ex. 1E is comparative.

EXAMPLE 2

The process of Ex. 1 was repeated with Polymer A using as solvent a mixed trimethylbenzene solvent (sold by ICI under the AROMOSOL H Reg. Trade Mark) 30% dispersions were made as described in Ex. 1.

EXAMPLE 3

In the manner described in Example A Poly (methyl acrylate) MW 40,000 was transesterified in refluxing toluene solution, under sodium ethoxide catalysis, with 0.9 molar equivalents of octadecanol. 1H NMR spectroscopy on the transesterified product indicated a level of 95% of transesterification of methyl ester groups. The toluene was evaporated under vacuum and the polymer residue was dissolved in SOLVESSO 100 solvent at 75° C. to form a 60% (by weight) solution. The hot solution at 75° C. was then emulsified with an equal weight of a 3% aqueous solution of NP20 (nonyl phenyl eicosa-ethyleneoxylate) surfactant added at 75° C. with high shear mixing as in Ex. 1. Emulsification occurred readily when the polymer solution was above its gelling temperature (30° C.). The product on cooling to 25° C. was an aqueous emulsion having in the discontinuous phase droplets of 20–40 microns of an organic solution or suspension of polymer, the overall concentration of polymer in the product being 30% by weight.

EXAMPLE 4

In the manner described with respect to polymer A Poly (methyl acrylate) MW 40,000 was transesterified with eicosanol (0.8 molar equivalents) using sodium ethoxide catalysis, to produce a product with degree of transesterification of 79% as measured by $^1$H NMR spectroscopy. In the manner described in Ex. 1 a dispersion in mixed solvents SOLVESSO 100 solvent and butyl diglycol ether (BDGE) of this polymer was prepared N-2-aminoethyl-2-oleyl with imidazoline OI added to the SOLVESSO 100 solvent before addition of the BDGE. The dispersion had the weight composition of polymer (25.4%), OI (2.5%), SOLVESSO 100 solvent (16.9%) and butyl diglycol ether (55.1%);

EXAMPLE 5

In the manner described with respect to polymer A Poly (methyl acrylate) MW 40,000 was transesterified with docosanol (0.7 molar equivalents) using sodium ethoxide catalysis, to produce a polymer product with level of transesterification equal to 74% as measured by $^1$H NMR spectroscopy. In a manner described in Example 4 a dispersion of this polymer was prepared with a composition of polymer (25.5%), OI (2.5%), Solvesso 100 solvent (18.0%) and butyl diglycol ether (54.0%).

EXAMPLE 6

A dispersion was prepared by blending the dispersions prepared in Ex. 4 and 5 (I) in the weight ratio 1:2 ($C_{20}$:$C_{22}$). The blend dispersion had viscosity characteristics as described in Table 2. The dispersions of the invention were tested as inhibitors of the wax deposition in a wax containing oil.

Coaxial Shearing Cell Wax Deposition Test

The test apparatus comprised an internally water cooled stationary cylinder which was fitted with upper inlet and outlet tubes for coolant, and a rotatable drum coaxial with the cylinder and spaced from it by an annulus, which in this test contains the fluid to be tested. The drum, fitted with a motor, is immersed in a water bath (at about 38° C.).

In the test the drum was mounted for rotation in the bath, a thermal insulator pad laid in the bottom of the drum and the liquid to be tested poured into the drum. The cylinder was then lowered into the liquid down to the pad. The drum was rotated at 150 rpm to effect shearing in the liquid. The coolant flow was then started and the flow rate and temperatures of coolant, cylinder and drum monitored. The temperature of the cylinder was kept at a fixed temperature in the 15–20° C. region, which caused wax to be deposited on the outer surface of the cylinder. Every 6 hrs the rotation was stopped, the cylinder removed and the oil adherent to the wax removed, followed by removal of the solid wax coating which was weighed to give the weight of wax deposited in the 6 hr from which the rate of deposition was calculated and expressed as g per day. The Coaxial Shear test, a measure of efficiency of wax inhibition, was performed with a shear rate 500 rpm using a black crude oil from West of Shetland, Scotland containing 9.0% (wt) wax and with a WAT and cloud point of about 38° C. and Pour Pt. of −9° C. With the mixed polymer dispersion of Example 6 (770 ppm), and cold plate temperature 17.5° C., the weight of wax deposited per day was 3.7 g, with wax deposition tendency of 0.097 g/day. Watt. This compares with a blank run on the oil in the absence of the dispersion in which wax deposited per day was 8.276 g, wax deposition tendency of 0.21 g/day. Watt and a comparative run conducted in the presence of a solution providing the same weight loading of polymer wherein the wax deposited per day was 3.264 g, wax deposition tendency of 0.079 g/day. Watt.

EXAMPLE 7

The dispersions of Examples 4 and 5 were each filtered to leave the respective solid polymers, which were then mixed together in a weight ratio of 1:2 and the mixed solids were dispersed in water at 20° C. with ultra sound mixing to give a 26% (wt) dispersion of the polymer blend in water.

EXAMPLE 8

A 60% (by weight) solution of a 2:1 mixture of polymer A: Polymer B in AROMASOL H solvent was made by mixing the various components together up to 70° C. The solution was very viscous. To the hot solution at 70° C. was added with stirring mono-butyl diethylene glycol (BDGE) dropwise, in a 1:1 weight ratio (i.e. with polymer:solvent-:BDGE weight ratios of 60:40:100), and then the solution obtained at 70° C. was allowed to cool to 20° C. over 10 mins with stirring to leave a dispersion of solid polymer of broad particle size distribution of 10–200 microns. To the dispersion with stirring was added (1% by. weight of polymer) of a dispersing agent, as specified below, followed by high shear mixing in an Ultra Turrax shear mixer operated at 5000 rpm for 20 seconds. The fine dispersion obtained had particles substantially all of which were of less than 10 microns in size; the dispersion was smooth and substantially non sedimenting on standing for 5 days. The viscosity-temperature characteristics of the fine dispersion were measured at a shear rate of 92 sec$^{-1}$ and using a concentric cylinder arrangement on a Bohlin VOR rheometer.

The viscosity-temperature characteristics for Ex. 8 and 6 are shown in

TABLE 2

| | | Viscosity (cP) at Temperature | | | |
|---|---|---|---|---|---|
| Example | Solvent | −1° C. | 5° C. | 10° C. | 16° C. |
| 8 | AROMASOL H | 88 | 74 | 72 | 71 |
| 6 | SOLVESSO 100 | 59 | 52 | 48 | 46 |

We claim:

1. A dispersion of an ester polymer in at least one liquid wherein said ester polymer is a polymer consisting essentially of a first monomer with structural units derived from at least one ester (1) of an aliphatic carboxylic acid with an aliphatic alcohol, wherein one of the acid and alcohol is ethylenically unsaturated and the other of the acid and alcohol has a long chain group of 14–40 carbons, optionally, a second monomer which is a monomer derived from a different ester (2) within the same definition as ester (1), such that the mole average carbon content of the long chain group is 15–35, and a third monomer with structural units derived from a corresponding ester (3) of an aliphatic carboxylic acid and an aliphatic alcohol, wherein one of the acid and alcohol is ethylenically unsaturated and the other has an aliphatic group of 1–13 carbons, such that at least 30% of the said aliphatic groups have 15–35 carbons, and wherein the polymer is present in said dispersion in at least 10% by weight and the dispersion is in a liquid which comprises at least one first organic liquid selected from the group consisting of (a) a branched or linear aliphatic hydrocarbon of 6–16 carbon atoms and (b) an aromatic hydrocarbon of 6–10 carbon atoms.

2. A dispersion according to claim 1 wherein the ester polymer is in dispersion in a first organic liquid and a third organic liquid which is completely miscible therewith but in which the polymer is substantially insoluble at 20° C.

3. A dispersion according to claim 2 which contains at least a third organic liquid which is an oxygenated hydrocarbon containing 1–6 oxygen atoms.

4. A dispersion according to claim 3 wherein the oxygenated hydrocarbon is a branched of linear alkanol of 8–18 carbon atoms.

5. A dispersion according to claim 4 wherein the oxygenated hydrocarbon is a glycol of glycol ether of the formula $$R^1(OR^2)_n(OR^3)_mOR^4$$

wherein each of $R^1$ and $R^4$, which may be the same or different is hydrogen or and alkyl of 1–8 carbons, each of $R^2$ and $R^3$, which may be the same of different is an alkyl group of 2–4 carbons, and n and m are 0 or integers of 1–6, with the proviso that at least one of n and m is 1–6.

6. A dispersion according to claim 5 wherein the glycol ether is monobutyl-di-ethylene glycol ether.

7. A dispersion according to claim 2 wherein the liquid hydrocarbon comprises trimethylbenzene, the third organic liquid is mono-butyl-di-ethylene glycol ether and the ester polymer is the product obtainable by or obtained by transesterification of at least one polymer of an ester (3) with an aliphatic alcohol of carboxylic acid with a 15–35 carbon atom group, and wherein the transesterification is at least 30% complete.

8. A dispersion according to claim 1 wherein the polymer is in a dispersion in said first organic liquid which is itself in an emulsion in a second liquid which is immiscible with said first organic liquid.

9. A dispersion according to claim 8 wherein the second liquid comprises water.

10. A dispersion according to claim 1 wherein the first organic liquid is benzene, toluene, xylene or mesitylene.

11. A dispersion according to claim 1 which comprises at least 20% of polymer.

12. A dispersion according to claim 11 which comprises at least 25% of polymer.

13. A dispersion according to claim 1 wherein said esters 1, 2 and 3 are derived from an ethylenically unsaturated carboxylic acid of 3–6 carbon atoms and an aliphatic alcohol.

14. A dispersion according to claim 13 wherein said acid is methacrylic or acrylic acid.

15. A dispersion according to claim 1 wherein the ester polymer is the product obtainable by or obtained by transesterification of at least one polymer of an ester (3) with an aliphatic alcohol or carboxylic acid with a 15–35 carbon atom group, and wherein the transesterification is at least 30% complete.

16. A dispersion according to claim 1 wherein the average particle size of said polymer is 1–20 microns.

17. A dispersion according to claim 1 which comprises a monomeric additive with a long chain hydrocarbyl group and a polar group.

18. A dispersion according to claim 17 which comprises N-2 amino ethyl-2-oleyl-imidazoline.

19. A dispersion according to claim 1 wherein the dispersion comprises a dispersing agent.

20. A dispersion according to claim 19 wherein the dispersion contains 0.1–10% by weight of dispersing agent (based on the total weight of the polymer).

21. A method of preparing a dispersion according to claim 19 which comprises:
   (a) forming a solution of the ester polymer in a first liquid hydrocarbon at a temperature of at least 60° C.;
   (b) adding a third liquid which is an oxygenated hydrocarbon to the hot solution until the mixture obtained is just not cloudy;
   (c) allowing the mixture to cool slowly at a rate of not more than 10° C. per minute whilst stirring; and
   (d) adding at least one dispersing agent so that the cooling is performed in its presence.

* * * * *